United States Patent Office 3,388,078
Patented June 11, 1968

3,388,078
NOVEL EPOXY COMPOUNDS AND
POLYMERS THEREFROM
Francis W. Evans and Morton H. Litt, Morristown, N.J.,
assignors to Allied Chemical Corporation, New York,
N.Y., a corporation of New York
No Drawing. Filed Dec. 13, 1965, Ser. No. 513,526
9 Claims. (Cl. 260—2)

ABSTRACT OF THE DISCLOSURE

This invention relates to fluorinated ethers terminated at one end by an epoxy ethyl group and to the polymerization of these compounds to form novel polymers. These polymers can be coated onto fabric, paper or other material by conventional means to provide water-repellent coatings.

In our copending United States patent application Ser. No. 492,276 filed Oct. 1, 1965, there is disclosed a new class of fluorinated ethers. We have now discovered that certain of these fluorinated ethers can be converted to epoxy compounds that can be employed as intermediates in the preparation of useful epoxy polymers. The epoxy compounds of this invention have the formula:

$$F-\underset{R'}{\overset{R}{C}}-O-CF_2-\underset{Y}{\overset{X}{C}}-CH_2-CH\overset{O}{\underset{\diagdown}{\diagup}}CH_2$$

where R and R' are independently selected from the group consisting of fluorine and perhalogenated alkyl radicals in which the halogen atoms are selected from the group consisting of fluorine and chlorine with at least one fluorine atom being attached to each carbon atom, X is selected from the group consisting of fluorine, chlorine, bromine and hydrogen, and Y is fluorine or hydrogen. When R and/or R' is a perhalogenated alkyl group, preferably the number of carbon atoms in each perhaloalkyl group is 1 to 8 with the sum of the carbon atoms in both groups not exceeding 10.

The epoxy compounds are prepared from fluorinated ethers of the formula:

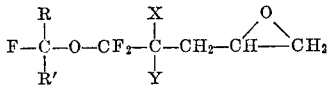

where R, R', X and Y have the meanings given above. The starting materials are obtained by the following sequence of reactions.

(I)

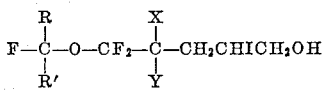

(II)

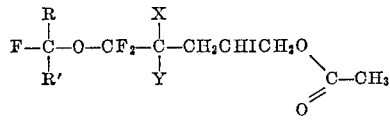

where R, R', X and Y have the meanings given above, M is selected from the group consisting of potassium, cesium, silver, rubidium, and tetraalkylammonium ions, and Z is iodine or chlorine. The first reaction is preferably carried out in a solvent medium selected from the group consisting of lower alkyl nitriles such as acetonitrile, lower alkyl t-amides such as dimethyl formamide, nitrobenzene, butyrolactone, sulfolanes such as 3-methyl sulfolane, and sulfones such as methyl ethyl sulfone. Advantageously 0.8 to 4 mols of the reactant MF is used for each mol of the reactant.

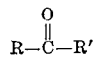

The second reaction can be carried out in the same solvent medium as the first reaction and both reactions proceed at a satisfactory rate at room temperature. A more detailed description of the fluorinated ethers and their preparation is given in the above-cited copending application 492,276.

Two different procedures can be employed to convert the fluorinated ether starting materials to epoxy compounds. In one process the fluorinated ether is reacted with allyl alcohol to form an intermediate of the formula:

$$F-\underset{R'}{\overset{R}{C}}-O-CF_2-\underset{Y}{\overset{X}{C}}-CH_2CHICH_2OH$$

where X, Y, R and R' have the meanings given above. This reaction is preferably conducted in the presence of actinic light at temperatures of about 0° to 150° C. The intermediate is then converted to the desired epoxy compound by reaction with an alkali metal hydroxide that is preferably added in the form of an aqueous solution. This reaction proceeds readily at room temperature although higher or lower temperatures can be used if desired.

In the second procedure the fluorinated ether starting material is first reacted with allyl acetate to form an ester intermediate of the formula:

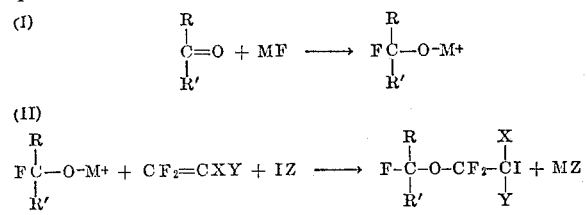

where R, R', X and Y have the meanings given above. This reaction is conducted in the presence of a free radical generating compound at a temperature of about 50° to 190° C. Suitable free radical generating compounds include organic peroxides such as benzoyl peroxide and di-tert-butyl peroxide and organic azonitriles such as α,α'-azobisisobutyronitrile, α,α'-azobis - α,γ - dimethylvaleronitrile and α,α'-azobiscyclohexanecarbonitrile. The ester intermediate is converted to the desired epoxy compound by reaction with an alkali metal hydroxide. This reaction can be conducted over a wide range of temperature with satisfactory reaction rates being obtained at room temperature.

The following examples are given to illustrate the best modes contemplated by us of preparing the epoxy compounds of this invention and they are not intended to limit the scope of the invention.

EXAMPLE 1

Fifty-five grams of allyl alcohol and 100 grams of $(CF_3)_2CF-O-CF_2CF_2I$ were added to a glass reaction vessel equipped with a reflux condenser and magnetic stirring means. The reactants were stirred for 72 hours at temperatures of about 80°–90° C. while being irradiated by an ultraviolet lamp. The product was fractionally distilled to give a 79% yield of a compound of the formula $(CF_3)_2CF-O-CF_2CF_2CH_2-CHICH_2OH$. This product had a boiling point of 86°–96° C./40 mm. and a refractive index of $n_D^{22°C.}=1.3792$. Elemental analysis was as follows. Calculated: H, 1.28%; F, 44.5%. Found: H, 1.42%; F, 44.9%.

Twenty-five grams of this compound was reacted with a solution of 2.4 grams of NaOH in 30 ml. of water. The two layers that formed were separated and the aqueous layer was extracted with diethyl ether. The extract was combined with the organic layer and the combined liquid phase was fractionally distilled giving 9.0 grams of the epoxy compound of the formula:

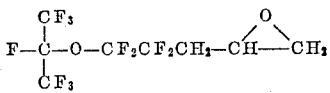

This compound had a boiling point of 60°–66° C./40 mm. and a refractive index $n_D^{23°C.}=1.3086$. Elemental analysis was as follows. Calculated: C, 28.1%; H, 1.50%; F, 61.1%. Found: C, 28.6%; H, 1.50%; F. 62.0%.

EXAMPLE 2

One mol of allyl acetate and 1 mol of

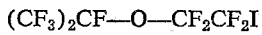

are admixed with 0.2 mol of α,α′-azobisisobutyronitrile and the reaction mixture is refluxed for 5 hours under a nitrogen atmosphere. Fractional distillation of the product gives

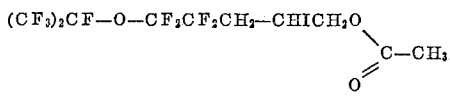

A 0.1-mol sample of this compound is dissolved in ethyl ether and 0.2 mol of NaOH is added to the solution. The reaction mixture is then refluxed for 5 hours. Fractional distillation of the product gives the same epoxy compound as produced in Example 1.

Other epoxy compounds within the scope of this invention can be prepared by the procedures of Examples 1 and 2 by substituting other suitable fluorinated ether starting materials for the $(CF_3)_2CF-O-CF_2CF_2I$. Illustrative of such fluorinated ethers are $(CF_3)_2CF-O-CF_2CH_2I$ $(CF_3)_2CF-O-CF_2CFClI$ $(CF_3)_2CF-O-CF_2CFBrI$

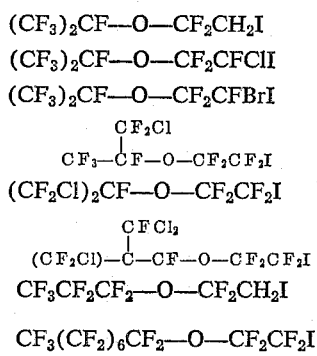

$(CF_2Cl)_2CF-O-CF_2CF_2I$ $CF_3CF_2CF_2-O-CF_2CH_2I$ and $CF_3(CF_2)_6CF_2-O-CF_2CF_2I$ The epoxy compounds can be polymerized to form polymers composed of recurring units of the formula:

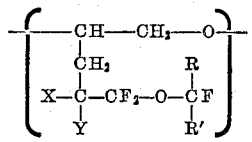

where R, R′, X and Y have the meanings given above. The polymerization can be carried out by heating the epoxy compound at a temperature of 50°–200° C. in the presence of a catalytically active metal compound. Suitable metal compounds include $FeCl_3$, aluminum isopropoxide, $TiCl_3$ and zinc dialkyl such as $Zn(C_2H_5)_2$. Advantageously the mol ratio of monomer to catalyst is about 10:1 to 1000:1.

The polymers produced are viscous oils or solids depending upon the molecular weight. These polymers can be coated onto fabric, paper, or other material by conventional means to provide water-repellent coatings. The polymers in which R and R′ are perfluoroalkyl groups and X and Y are fluorine are the better water repellents. The polymeric oils are also useful as lubricants. Those polymeric oils in which R and/or R′ contain chlorine or bromine are the better lubricants.

The solid amorphous polymers of this invention are useful as synthetic rubbers.

The following example is given to illustrate the preparation of the epoxy polymers of this invention and is not intended to limit the scope of the invention.

EXAMPLE 3

5.2 grams of

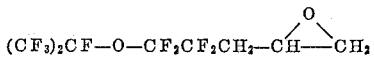

and 0.059 gram of $FeCl_3$ were sealed in a polymerization tube and heated for four days at 95° C. The resulting product was dissolved in 15 ml. of trifluoromethyl benzene. The solution was treated with three drops of concentrated HCl and then poured into methanol. The polymer separated as a viscous, yellow liquid which settled to the bottom of the reaction mixture. A total of 2.7 grams of polymer was obtained. The polymer had a reduced viscosity of 0.08 in a 1.4% solution in trifluoromethyl-benzene at 25° C. The polymer was soluble in trifluoromethylbenzene and 1,2-dichloroperfluorocyclohexene and insoluble in ethanol and diethyl ether.

A solution of the polymer in trifluoromethylbenzene was applied to paper and the solvent evaporated leaving a water-repellent coating on the paper.

It will be apparent that many modifications and variations may be effected without departing from the scope of the novel concepts of the present invention, and the illustrative details disclosed are not to be construed as imposing undue limitations on the invention.

We claim:

1. A compound of the formula:

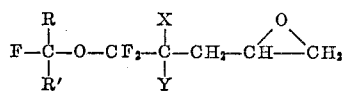

where R and R′ are independently selected from the group consisting of fluorine and perhalogenated alkyl radicals of 1 to 8 carbons in which the halogen atoms are selected from the group consisting of fluorine and chlorine with at least one fluorine atom being attached to each carbon atom; X is selected from the group consisting of fluorine, chlorine, bromine and hydrogen; and Y is selected from the group consisting of fluorine and hydrogen.

2. A compound as claimed in claim 1 wherein R and R′ are perfluorinated alkyl radicals of 1 to 8 carbons and X and Y are fluorine.

3. A compound as claimed in claim 1 wherein R and R′ are trifluoromethyl groups and X and Y are fluorine.

4. A polymer composed essentially of recurring units of the formula:

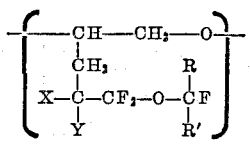

where R and R′ are independently selected from the group consisting of fluorine and perhalogenated alkyl radicals of 1 to 8 carbons in which the halogen atoms are selected from the group consisting of fluorine and chlorine with at least one fluorine atom being attached to each carbon atom; X is selected from the group consisting of fluorine, chlorine, bromine, and hydrogen; and Y is selected from the group consisting of fluorine nad hydrogen.

5. A polymer as claimed in claim 4 wherein R and R′ are perfluorinated alkyl radicals of 1 to 8 carbons and X and Y are fluorine.

6. A polymer as claimed in claim 4 wherein R and R′ are trifluoromethyl groups and X and Y are fluorine.

7. A process as claimed in claim 9 wherein the polymerization is conducted at a temperature of about 50° to 200° C.

8. A process as claimed in claim 9 wherein said metal compound is ferric chloride.

9. A process for the preparation of a polymer composed essentially of recurring units of the formula:

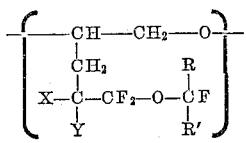

where R and R′ are independently selected from the group consisting of fluorine and perhalogenated alkyl radicals of 1 to 8 carbons in which the halogen atoms are selected from the group consisting of fluorine and chlorine with at least one fluorine atom being attached to each carbon atom; X is selected from the group consisting of fluorine, chlorine, bromine, and hydrogen; and Y is selected from the group consisting of fluorine and hydrogen, said process comprising heating a compound of the formula:

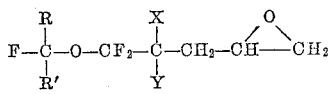

where R, R′, X and Y have the meanings given above, in the presence of a catalytically active metal compound selected from the group consisting of FeCl$_3$, aluminum isopropoxide, TiCl$_3$ and zinc dialkyl.

No references cited.

WILLIAM H. SHORT, *Primary Examiner.*

T. E. PERTILLA, *Assistant Examiner.*